(12) United States Patent
Drnevich et al.

(10) Patent No.: US 7,137,257 B2
(45) Date of Patent: Nov. 21, 2006

(54) GAS TURBINE POWER AUGMENTATION METHOD

(75) Inventors: Raymond Francis Drnevich, Clarence, NY (US); Troy Michael Raybold, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 162 days.

(21) Appl. No.: 10/958,270

(22) Filed: Oct. 6, 2004

(65) Prior Publication Data

US 2006/0070383 A1    Apr. 6, 2006

(51) Int. Cl.
*F02C 3/30* (2006.01)
(52) U.S. Cl. ........................ 60/775; 60/39.53
(58) Field of Classification Search ................. 60/773, 60/774, 775, 794, 39.3, 39.53, 39.56
See application file for complete search history.

(56) References Cited

U.S. PATENT DOCUMENTS

| | | | |
|---|---|---|---|
| 4,448,018 A * | 5/1984 | Sayama et al. ............... 60/775 |
| 4,667,467 A | 5/1987 | Archer et al. ............... 60/39.02 |
| 4,695,224 A | 9/1987 | Lown ........................ 415/116 |
| 5,083,425 A * | 1/1992 | Hendriks et al. ......... 60/39.183 |
| 5,181,376 A * | 1/1993 | Rao .............................. 60/775 |
| 5,218,815 A * | 6/1993 | Korenberg .................... 60/775 |
| 5,761,896 A * | 6/1998 | Dowdy et al. ................ 60/775 |
| 6,012,279 A | 1/2000 | Hines ........................ 60/39.05 |
| 6,038,849 A | 3/2000 | Nakhamkin et al. ....... 60/39.05 |
| 6,268,074 B1 | 7/2001 | Siepierski et al. ............ 429/13 |
| 6,715,295 B1 * | 4/2004 | Gadde et al. ................. 60/775 |
| 6,763,662 B1 * | 7/2004 | Hendriks ..................... 60/728 |
| 6,968,698 B1 * | 11/2005 | Walsh et al. .................. 60/775 |
| 2001/0000049 A1* | 3/2001 | Kataoka et al. ........... 60/39.05 |
| 2003/0196439 A1* | 10/2003 | Utamura ...................... 60/775 |
| 2003/0217553 A1* | 11/2003 | Gadde et al. ................. 60/775 |
| 2005/0109033 A1* | 5/2005 | Braun et al. .................. 60/772 |
| 2005/0172635 A1* | 8/2005 | Carlson et al. ............... 60/775 |

* cited by examiner

Primary Examiner—William H. Rodriguez
(74) Attorney, Agent, or Firm—Flora W. Feng

(57) ABSTRACT

A power augmentation method for a gas turbine in which water is injected into one or more stages of an auxiliary compressor to produce a vapor containing gas stream. The vapor containing gas stream is at least in part introduced into combustors of the gas turbine for power augmentation. Part of the vapor containing compressed gas stream can be introduced into a reactor to generate a hydrogen containing synthesis gas to support lower flame temperatures occurring within the combustors of the gas turbine due to the introduction of the vapor containing gas stream. In such manner, NOx emissions of the gas turbine can be reduced. Furthermore, the power augmentation method can be conducted in conjunction with an integrated gasification combined cycle.

16 Claims, 2 Drawing Sheets

GAS TURBINE POWER AUGMENTATION METHOD

FIELD OF THE INVENTION

The present invention relates to a method for augmenting the power output of the gas turbine in which a water vapor containing compressed gas stream is introduced into the gas turbine combustor to increase the mass flow rate to the expander and therefore the power output of the gas turbine.

BACKGROUND OF THE INVENTION

Gas turbines are used in a variety of industrial settings to supply power to a load, generally an electrical generator. A gas turbine consists of a compressor to compress air and an expander to recover energy from the compressed air after having been heated. The compressed air is heated within a set of combustors located between the compressor and the expander by supporting combustion of a fuel introduced into the combustors.

There are a variety of prior art examples in which the potential power output of a gas turbine is increased by water injection into the compressor, the combustor or both. Water injection into the compressor increases the efficiency of the compressor and thus reduces the amount of energy drawn from the expander to compress the air. Water injection into the combustor increases the amount of mass being expanded and therefore, the power output of the gas turbine.

For example, U.S. Pat. No. 4,667,467 utilizes water injection to the compressor to provide high efficiency electric power production in connection with the gasification of coal. In this patent, water spray intercooling of the gas turbine compressor is used along with an evaporative spray cooler to add water to the air to be compressed in the compressor. The resultant compressed, air-water mixture is used to a minor extent in the coal gasifier. The major part of such mixture is fed into a combustor. While undoubtedly, high gas turbine efficiencies are realized, the amount of potential increase of the power output is limited due to the fact that the compressor is coupled to the expander and for given atmospheric conditions there is only so much water that can be fed to the compressor. Water liquid, as opposed to water vapor could destroy the gas turbine due to blade erosion. Hence, since the amount of water fed to the compressor is limited, the amount of water potentially fed to the combustor and the expander is also limited.

U.S. Pat. No. 6,038,849 discloses a system for augmenting the power produced by a gas turbine by introduction of water into the combustor along with supplemental compressed air produced by a separate compressor train. The system disclosed in this patent is specifically designed to increase the power output of a gas turbine due to power losses occurring at high ambient temperature and elevation or in other words, conditions of low air density. In one embodiment, the separate compressor train utilizes interstage cooling to increase the efficiency of the compressor train. The compressed air, which can be further cooled, is then introduced into a saturator and then preheated. The preheated air, thereby containing water vapor, is introduced into the gas turbine combustor. The efficiency of power augmentation that is possible is limited in this patent in that although interstage cooling of the separate compressor train reduces power input, an energy loss exists at the intercooler which rejects heat between the compression stages to the ambient. In fact, the patent contemplates yet further cooling of the compressed air in an aftercooler that would further reject the heat of compression.

As will be discussed, the present invention provides a power augmentation system for a gas turbine in which water injection is utilized in a manner that overcomes such problems of the prior art as have been discussed above.

SUMMARY OF THE INVENTION

The present invention provides a method of augmenting the power of a gas turbine having a compressor to compress an air stream, combustors to combust fuel and thereby add heat to the air stream after compression and an expander to receive the compressed air stream after having been heated. In accordance with the method, a gas is compressed in a plurality of stages of an auxiliary compressor. Water is injected into at least one of the stages so that the auxiliary compressor produces a vapor containing compressed gas stream. At least part of the vapor containing compressed gas stream is introduced into the combustor of the gas turbine to increase mass flow rate to the expander and thereby to increase power output of the gas turbine. The at least part of the vapor containing compressed gas stream can be combined with the air stream after compression to introduce the at least part of the vapor containing compressed gas stream into the combustors. Alternatively, the at least part of the vapor containing compressed gas stream is introduced directly into the combustors.

Thus, the vapor containing compressed gas stream is efficiently produced in the auxiliary compressor in that there is cooling provided through the introduction of water. At the same time, heat is not rejected to the atmosphere by virtue of such cooling. The resultant compressed stream can be directly utilized for injection into the combustor. Since, however, such stream is not generated by a compressor coupled to the expander, the degree of power augmentation is not limited by such coupling.

The gas to be compressed in the auxiliary compressor can be an oxygen containing gas, for instance, air. In such case, the vapor containing compressed gas stream produced by the auxiliary compressor can be divided into first and second subsidiary streams. The first subsidiary stream can be introduced into the combustors of the gas turbine as a diluent to at least in part lower flame temperatures. The second subsidiary stream can be reacted with a hydrocarbon containing gas stream to produce a hydrogen containing synthesis gas. The hydrogen containing synthesis gas can then be introduced into the combustors of the gas turbine to maintain a stable flame within the combustors at the flame temperatures.

The second subsidiary stream can be reacted with the hydrocarbon by catalytic partial oxidation and then rapidly cooled.

In any embodiment of the present invention, at least part of the vapor containing compressed gas stream can be superheated to a temperature of at least about 50° F. above the saturation temperature. This is done to prevent possible condensation of the water vapor and consequent erosion of the compressor blades within the gas turbine. In addition to superheating, the vapor containing compressed gas stream can be saturated prior to the superheating thereof.

In any embodiment of the present invention involving the production of synthesis gas, a hydrocarbon stream can be divided into a fuel stream and the hydrocarbon containing gas stream. The fuel stream can be combined with the hydrogen containing synthesis gas to form a combined fuel stream and the combined fuel stream can be introduced into the combustors. An alternative is to indirectly heat the fuel stream against cooling the hydrogen containing synthesis gas and to introduce the fuel stream and the hydrogen containing synthesis gas into the combustors separately.

In a yet further aspect, the power augmentation can be incorporated into an integrated gasification combined cycle to gasify coal. In accordance with such aspect, air can be fractionated into an oxygen enriched stream and a nitrogen enriched stream. The oxygen enriched stream can be utilized within a coal gasification system to produce a synthesis gas fuel stream. The nitrogen enriched stream can be compressed within the auxiliary compressor as the gas and the synthesis gas fuel stream can be introduced into the combustors as fuel for the gas turbine. Preferably, the air stream after compression within the compressor of the gas turbine can be divided into a compressor air stream and an extracted air stream. The compressor air stream can be introduced into the combustors. The air within the extracted air stream can be fractionated into the nitrogen enriched stream and the oxygen enriched stream

BRIEF DESCRIPTION OF THE DRAWINGS

While the specification concludes with claims distinctly pointing out the subject matter that Applicants regard as their invention, it is believed that the invention will be better understood when taken in connection with the accompanying figures, in which:

In order to avoid repetitious explanations, the same reference numbers have been used in the figures for elements that are common to all such figures.

DETAILED DESCRIPTION

Figure 1:
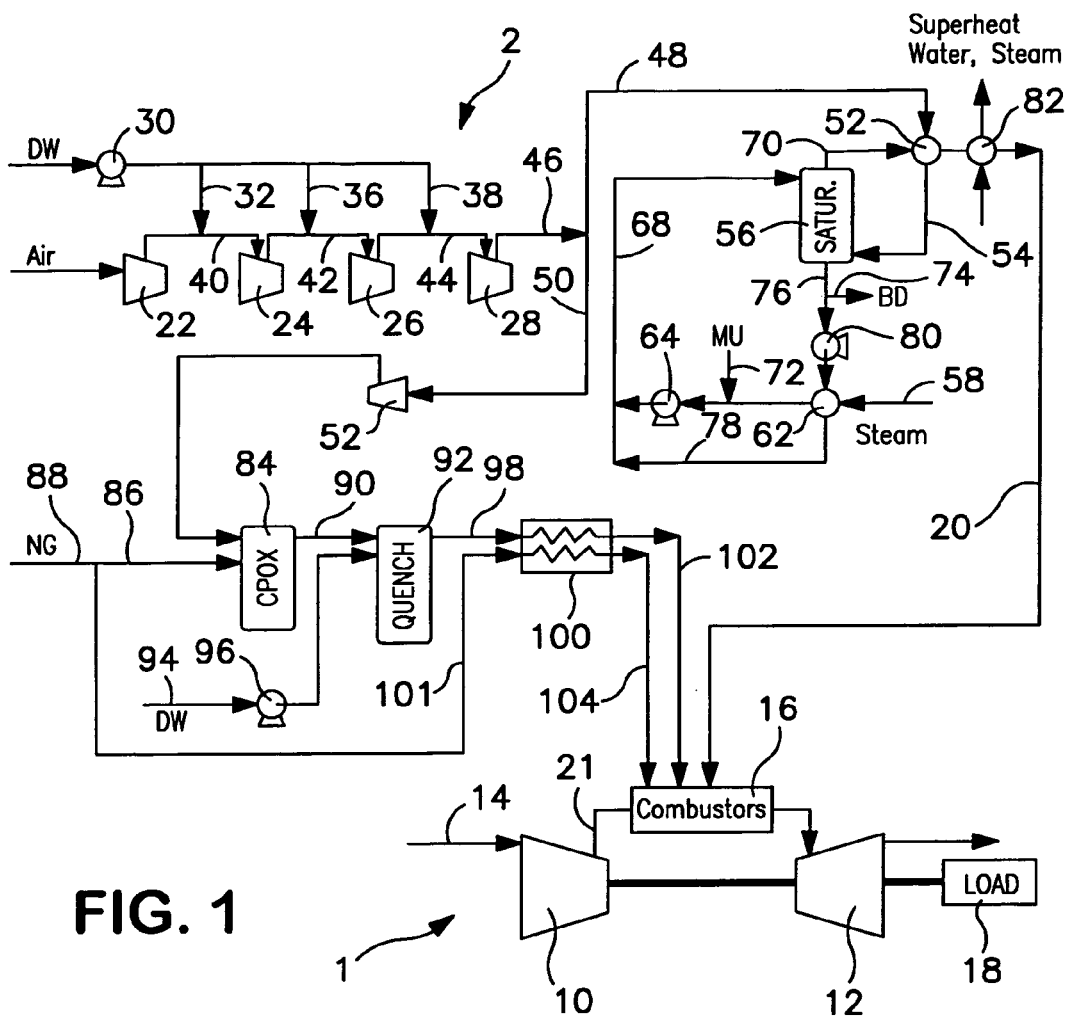
FIG. 1 is a schematic illustration of a method in accordance with the present invention in which the power output of a gas turbine is augmented by a compressed, water vapor containing stream.

With reference to FIG. 1, the power of a gas turbine 1 is augmented by use of systems that will be hereafter described.

Gas turbine 1 is provided with a gas turbine compressor 10 that is coupled to gas turbine expander 12. It is understood that turbine compressor 10 and gas turbine expander 12 could have a number of intermediate stages. An air stream 14 is compressed in compressor 10 and then introduced into combustors 16 as a compressed air stream. Fuel is added to the combustors and the combustion occurring therewithin produces a heated stream that is introduced to gas turbine expander 12. Gas turbine compressor 10 and expander 12 are mechanically coupled and the excess energy is used to power a load 18 which can be an electrical generator.

Figure 2:
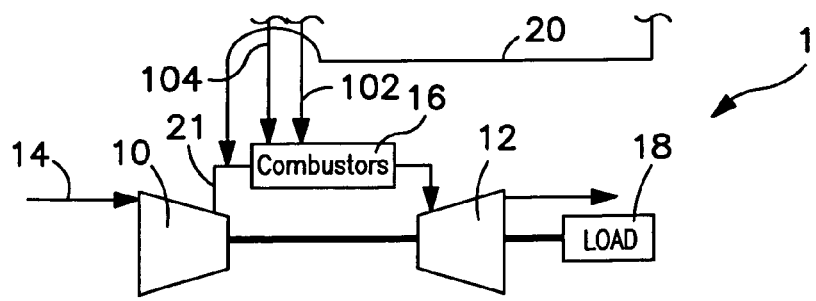
FIG. 2 is a fragmentary, schematic view of an alternative embodiment of FIG. 1.

The power of gas turbine 1 is augmented by a vapor containing compressed gas stream 20 produced by an auxiliary compressor that can be a water injected, intercooled air compressor train 2. The mass of vapor contained in compressed gas stream 20 introduced into combustor 16 increases the mass flow rate to gas turbine expander 12 to augment the power output and is done in a manner that does not reject heat to the atmosphere. With reference to FIG. 2, such introduction of the vapor containing compressed gas stream 20 can be direct as illustrated, or alternately can be through injection into the compressor discharge stream 21.

Water injected, intercooled air compressor train 2 is a four stage centrifugal type air compressor that has first, second, third and fourth stages 22, 24, 26 and 28, respectively. Spray intercooling is used between first and second stages 22 and 24; second and third stages 24 and 26 and third and forth stages 26 and 28. In this regard, demineralized water ("DW") is pumped by a pump 30 to pressurize the stream, which is subdivided and injected as streams 32, 36 and 38 into interstage compressed air streams 40, 42 and 44 by nozzles in a known manner.

Water enters the interstage compressed air streams 40, 42 and 44 in the form of a mist to fine droplets, typically between about 1 micron and about 100 microns in size. Preferably, the droplet size is between about 5 and about 20 microns in size. In commercially available spray units, water can be pressurized from between about 1000 and about 3000 psig through a stainless steel piping grid that contain multiple common injection nozzles. High pressures are used since water droplet size varies as the inverse square root of pressure. The type, location, number and orientation of injection nozzles is adjusted on a case-by-case basis to tailor the speed and extent of droplet vaporization for a given residence time. Injected water preferably vaporizes completely prior to entering a subsequent compressor stage. A compressed air stream 46 can be discharged at 280 psi and about 425° F. and can contain over 13 mole percent water.

Other types of water injection could be used. For instance, in a water injection process known as fogging, water injected before the compressor stage completely evaporates upon injection. This can be done at the compressor inlet alone. In a related type of water injection, known as over fogging, some of the water evaporates within the first stage. Even with spray intercooling used in connection with compressor train 2, it is possible that water would not be injected before or within all of the compressor stages.

While all of the vapor containing compressed air stream 20 can be introduced into combustors 16 of gas turbine 1 for power augmentation and NOX control, preferably, vapor containing compressed gas stream 46 is divided into a first subsidiary stream 48 and a second subsidiary stream 50. Additional mass and heat can optionally be added to first subsidiary stream 48 by way of saturation and superheating. Saturation and superheating can be used in case all of the vapor containing compressed gas stream 46 is routed to gas turbine 1. As illustrated, first subsidiary air stream 48 can be introduced into a heat exchanger 52 to produce a heated subsidiary stream 54 which is introduced to saturator 56. Saturator 56 can be a trayed, or packed tower having less than about 10 theoretical stages or a spray tower. A make up low pressure steam stream 58 is introduced into a heat exchanger 62 and then pressurized by way of a pump 64. The resultant pressurized stream 68 is introduced to the top of saturator 56 to produce a saturated stream 70. Additional water is added by way of a make up ("MU") stream 72.

In order to prevent contaminants from concentrating in the stream, water is extracted as a blow down ("BD") stream 74 from saturator water discharge stream 76. Stream 76 is recirculated through pump 80 into heat exchanger 62. The resulting heated saturator water discharge stream 78 is then added to pressurized stream 68 being introduced into saturator 56. Saturated stream 70 has a greater water concentration than first subsidiary stream 48, namely greater than 13 mole percent, typically at least 25 mole percent.

If saturation is conducted, then saturated stream 70 after having passed through heat exchanger 52 is superheated in a superheating heat exchanger 82 by the use of high pressure and high temperature water or steam. This superheating should be to a temperature of at least about 50° F. above the saturation temperature. Heating can be conducted whether or not saturation occurs. However, the resultant stream is injected, as stream 20, into combustors 16.

Second subsidiary stream 50 constitutes a relatively small proportion, namely between about 5 and about 10 percent of vapor containing compressed gas stream 46. Second subsidiary stream 50 is compressed in a compressor 52 and introduced into a catalytic partial oxidation reactor 84 of known design that contains a catalytic partial oxidation catalyst and that is designed to operate adiabatically. A first subsidiary natural gas stream 86, made up of natural gas stream 88, is introduced into catalytic partial oxidation unit 84 to react with the moisture laden, compressed oxygen containing gas to produce a high temperature synthesis gas stream 90 that contains such components as hydrogen and carbon monoxide. The use of a catalyst allows reactions to occur at lower temperatures than they would occur without a catalyst.

Figure 3:
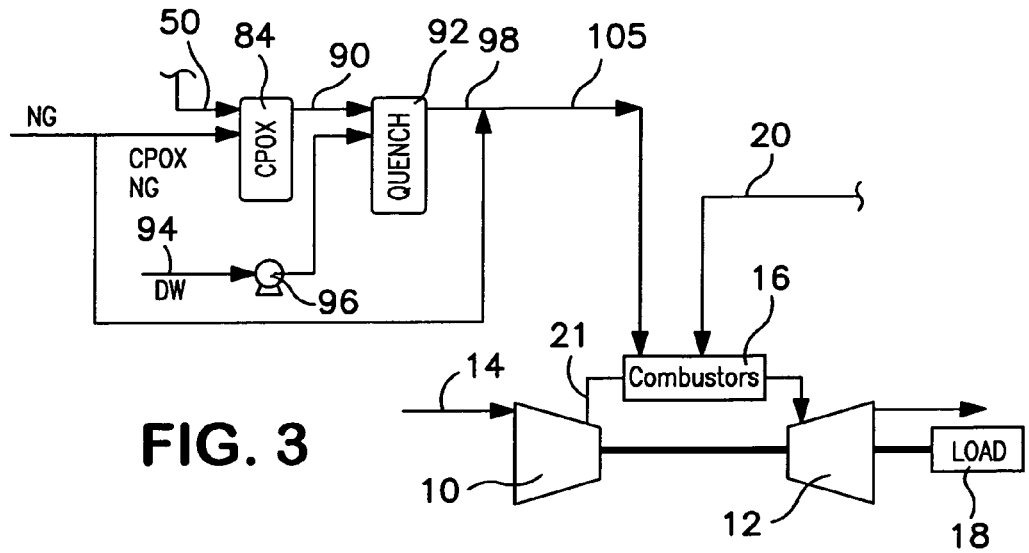
FIG. 3 is a fragmentary, schematic view of an alternative embodiment of FIG. 1.

The temperature of the high temperature synthesis gas stream 90 can be about 1500° F. and can contain about 28 mole percent hydrogen. The high temperature synthesis gas stream 90 is introduced into a quench unit 92 in which demineralized water ("DW") stream 94 is introduced after having been pressurized within a pump 96. This reduces the temperature of the hydrogen containing synthesis gas 90 to produce a partly cooled hydrogen containing synthesis gas stream 98 having a more manageable temperature of about 800° F. The partly cooled hydrogen containing synthesis gas stream 98 can be further cooled in a heat exchanger 100 to produce a hydrogen containing synthesis gas stream 102 that is introduced into combustor 16. A second subsidiary natural gas stream 101 is also passed through heat exchanger 100 to produce a fuel stream 104 which is thereby pre-heated and also fed to combustor 16. With reference to FIG. 3, as an alternative, the second subsidiary natural gas stream can be combined with the party cooled hydrogen containing synthesis gas stream 98 directly and a combined fuel stream 105 can be introduced into the combustors 16.

As may be appreciated by those skilled in the art, other types of hydrogen generation could be used in addition to catalytic partial oxidation. For instance, steam methane reforming could be used to produce the hydrogen containing synthesis gas stream 102.

The introduction of vapor containing compressed gas stream 20 into combustor 16, in addition to serving the purpose of power augmentation, also serves as a diluent to lower flame temperatures occurring within combustor 16. The lowering of flame temperatures will also lower NOx production. The addition of the hydrogen containing synthesis gas stream 102 will help to support the flame at the lower flame temperature envisioned in low NOx operation.

Combustor 16 may be a diffusion type of combustor in which vapor containing compressed gas stream 20, hydrogen containing synthesis gas stream 102 and fuel stream 104 are fed into a primary combustion zone in which mixing with a portion of the air stream and combustion occur simultaneously. A portion of the gas turbine air stream is mixed with the combustion products down stream of the primary combustion zone. Combustor 16 may also be a lean premix combustor that specifically designed for low-nox operation. In lean premix combustors, fuel and air are thoroughly mixed in an initial stage to obtain a lean fuel-air mixture. This mixture is introduced to a downstream stage where combustion takes place. In such combustors, nearly all of the compressed air stream is premixed with fuel stream 104 prior to combustion. The larger air stream and fuel premixing will reduce flame temperature by dilution of the fuel to near its flammability limit. The addition of vapor containing compressed gas stream 20 will further act as a diluent. In practice, vapor containing compressed gas stream 20 is introduced into the inlet of combustor 16 and the hydrogen containing synthesis gas stream 102 is introduced into either or both the premix and the combustion zone of the combustor 16 to extend the flammability limit of the fuel.

The operation of lean premix combustors, as well as diffusion combustors, is well known. As may be appreciated by those skilled in the art, in order to obtain both low NOx and power augmentation, fuel is added to the extent that turbine inlet temperatures are produced that are about equal to those generated during conventional operation and without the introduction of vapor containing compressed gas stream 20 and hydrogen containing synthesis gas stream 102.

As may be appreciated by those skilled in the art, intercooled compressor train 2 could be used to compress a stream that contains air or other gas such as nitrogen to serve as a diluent. This addition of such diluent to combustor 16 would in of itself decrease flame and temperature and thereby lower NOx emissions. Hence, the present invention contemplates the use of the intercooled compressor train 2 without the use of any synthesis gas generation and with or without superheating and etc. It is to be noted though as the amount of diluent is increased, natural gas or other fuel will reach the flammability limit for the combustor. Beyond that limit, the flame must be supported by combustion of hydrogen which is provided by hydrogen containing synthesis gas steam 102.

Figure 4:
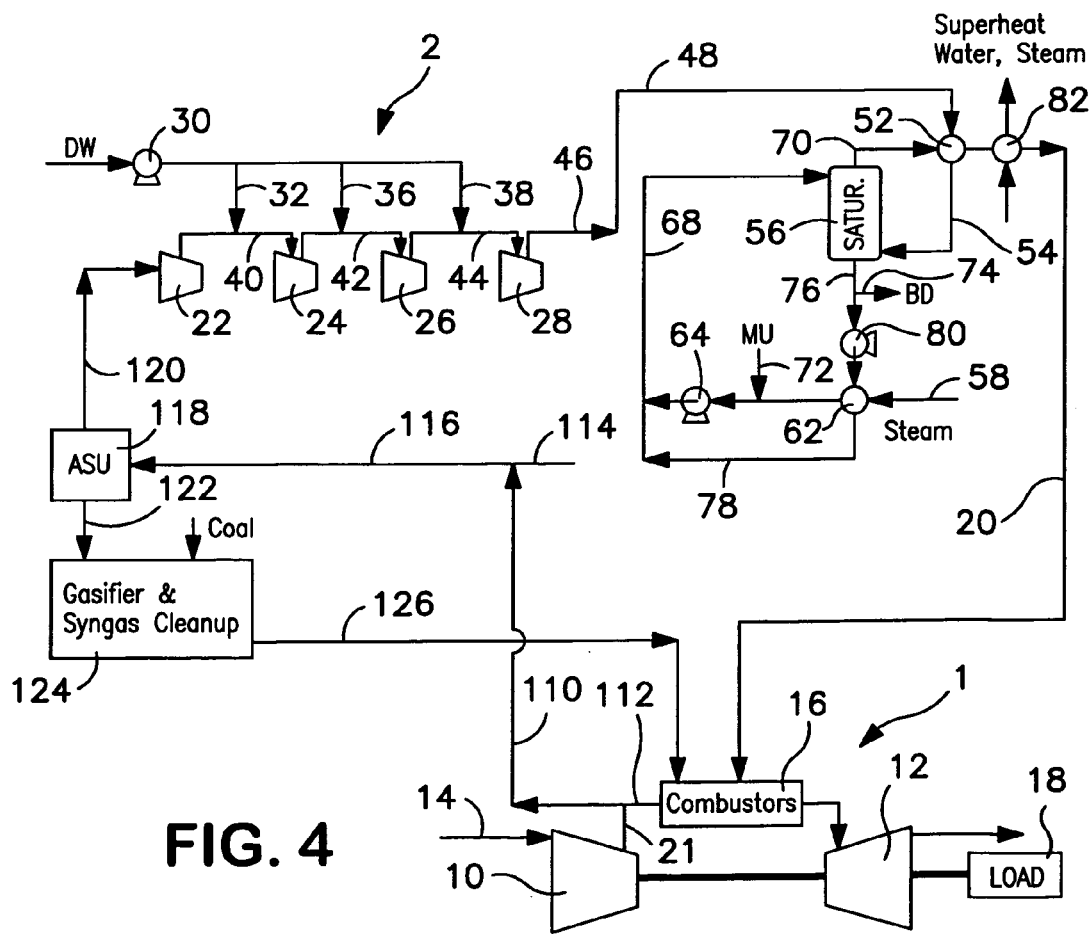
FIG. 4 is a schematic illustration of a method in accordance with the present invention involving augmentation of the power output of a gas turbine and an integration of the power augmented turbine within an integrated gasification combined cycle.

With reference to FIG. 4, an embodiment of the present invention is shown that involves an integrated gasification combined cycle in which coal or other solid liquid hydrocarbon is gasified to produce a synthesis gas fuel. In such embodiment, the compressor discharge stream 21 is divided into an extracted air stream 110 and a compressor air stream 112. The compressor air stream 112 is introduced into the combustors 16. The extracted air stream 110 is combined with a compressed air stream 114 to form a combined compressed air stream 116. In this regard, the compressed air stream 114 could be a stream that had been compressed by the main air compressor of an air separation unit 118. Alternatively, the extracted air stream 110 could alone be fractionated. A yet further alternative is to fractionate the air within the compressed air stream 114 alone and introduce the compressor discharge stream 21 in its entirety into the combustors 16. As illustrated, however, the combined compressed air stream 114 is introduced to the air separation unit 118 for fractionation by well-known cryogenic rectification techniques that typically include high and low pressure columns in a heat transfer relationship.

The fractionation of the air produces a nitrogen-rich stream 120 that preferably contains less than about 2 percent oxygen and an oxygen-rich stream 122. The oxygen-rich stream 122 is introduced into a known coal gasification system 124 to produce a synthesis gas fuel stream 126. The nitrogen-rich stream 120 is introduced into a water injected, intercooled air compressor train 2 for compression and the synthesis gas fuel stream 126 serves as fuel for the gas turbine 1.

While the present invention has been described with reference to a preferred embodiment, as will occur to those skilled in the art, numerous changes, additions and omissions may be made without departing from the spirit and the scope of the present invention.

We claim:

1. A method of augmenting the power of a gas turbine having a compressor to compress an air stream, combustors to combust a fuel and thereby add heat to the air stream after compression and an expander to receive the compressed air stream after having been heated, said method comprising:
   compressing a gas in a plurality of stages of an auxiliary compressor;
   injecting water into at least one of said stages so that said auxiliary compressor produces a vapor containing compressed gas stream; and
   introducing at least part of the vapor containing compressed gas stream into the combustors of the gas turbine to increase mass flow rate to the expander and thereby to increase power output of the gas turbine.

2. The method of claim 1, wherein the at least part of the vapor containing compressed gas stream is combined with the air stream after compression to introduce the at least part of the vapor containing compressed gas stream into the combustors.

3. The method of claim 1, wherein the at least part of the vapor containing compressed gas stream is introduced directly into the combustors.

4. The method of claim 2 or claim 3, further comprising:
   the gas being an oxygen containing gas;
   dividing the vapor containing compressed gas stream into first and second subsidiary streams;
   introducing the first subsidiary stream into the combustors of the gas turbine as a diluent to at least in part lower the flame temperatures; and
   reacting the second subsidiary stream with a hydrocarbon containing gas stream to produce a hydrogen containing synthesis gas; and
   introducing the hydrogen containing synthesis gas into the combustors of the gas turbine to maintain a stable flame within the combustors at the flame temperatures.

5. The method of claim 4, wherein the gas is air.

6. The method of claim 4, wherein said second subsidiary stream is reacted with the hydrocarbon containing gas stream by catalytic partial oxidation and then rapidly cooled.

7. The method of claim 1, further comprising superheating the at least part of the vapor containing compressed gas stream to a temperature of about 50° F. above the saturation temperature.

8. The method of claim 7, further comprising saturating the at least part of the vapor containing compressed gas stream prior to the superheating thereof.

9. The method of claim 8, wherein the gas is air.

10. The method of claim 9, further comprising:
    dividing the vapor containing compressed gas stream into first and second subsidiary streams;
    introducing the first subsidiary stream into the combustors of the gas turbine as a diluent to at least in part lower the flame temperatures;
    reacting the second subsidiary stream with a hydrocarbon containing gas stream to produce a hydrogen containing synthesis gas; and
    introducing the hydrogen containing synthesis gas into the combustors of the gas turbine to maintain a stable flame within the combustors at the flame temperatures.

11. The method of claim 10, wherein said second subsidiary stream is reacted with the hydrocarbon containing gas stream by catalytic partial oxidation and then rapidly cooled.

12. The method of claim 11, wherein a hydrocarbon stream is divided into a fuel stream and the hydrocarbon containing gas stream, the fuel stream is combined with the hydrogen containing synthesis gas to form a combined fuel stream and the combined fuel stream is introduced into the combustors.

13. The method of claim 11, wherein a hydrocarbon stream is divided into a fuel stream and the hydrocarbon containing gas stream and the fuel stream is indirectly heated by the hydrogen containing synthesis gas stream and introduced into the combustors as fuel.

14. The method of claim 12 or claim 13, wherein the at least part of the vapor containing compressed gas stream is introduced directly into the combustors.

15. The method of claim 1 or claim 7 or claim 8, further comprising:
    fractionating air into a nitrogen-rich stream and an oxygen-rich stream;
    introducing the oxygen-rich stream into a gasification system to produce a synthesis gas fuel stream;
    introducing the nitrogen-rich stream into the auxiliary compressor as the gas; and
    introducing the synthesis gas fuel stream into the combustors as fuel.

16. The method of claim 15, further comprising:
    dividing the air stream after compression within the compressor into a compressor air stream and an extracted air stream;
    introducing the compressor air stream into the combustors; and
    fractionating the air within the extracted air stream.

* * * * *